J. S. LYLE.
AGRICULTURAL IMPLEMENT.
APPLICATION FILED JUNE 29, 1916.

1,273,251.

Patented July 23, 1918
5 SHEETS—SHEET 1

WITNESSES
H. C. Barry
Myron T. Clear

INVENTOR
John S. Lyle
BY
ATTORNEYS

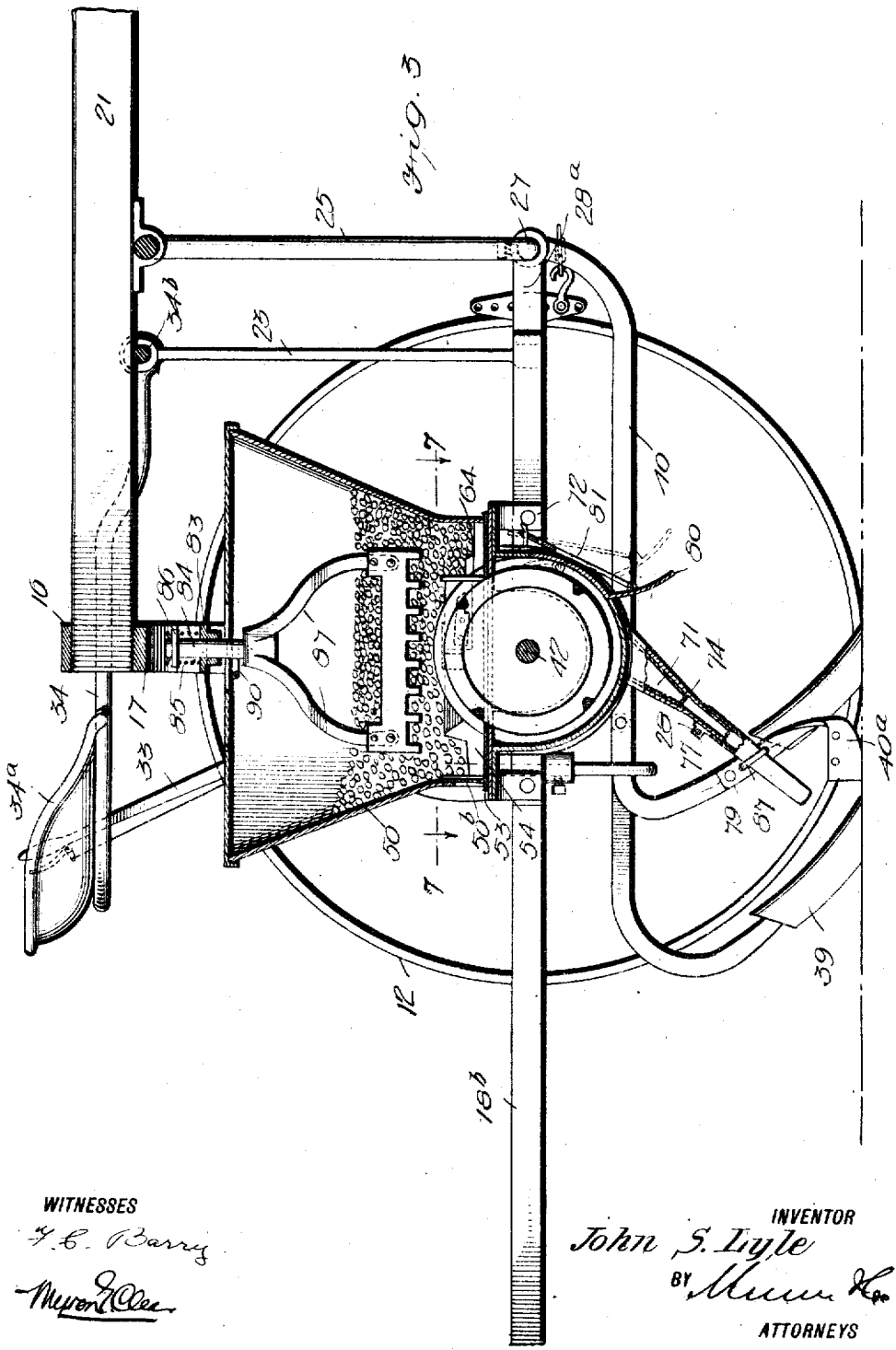

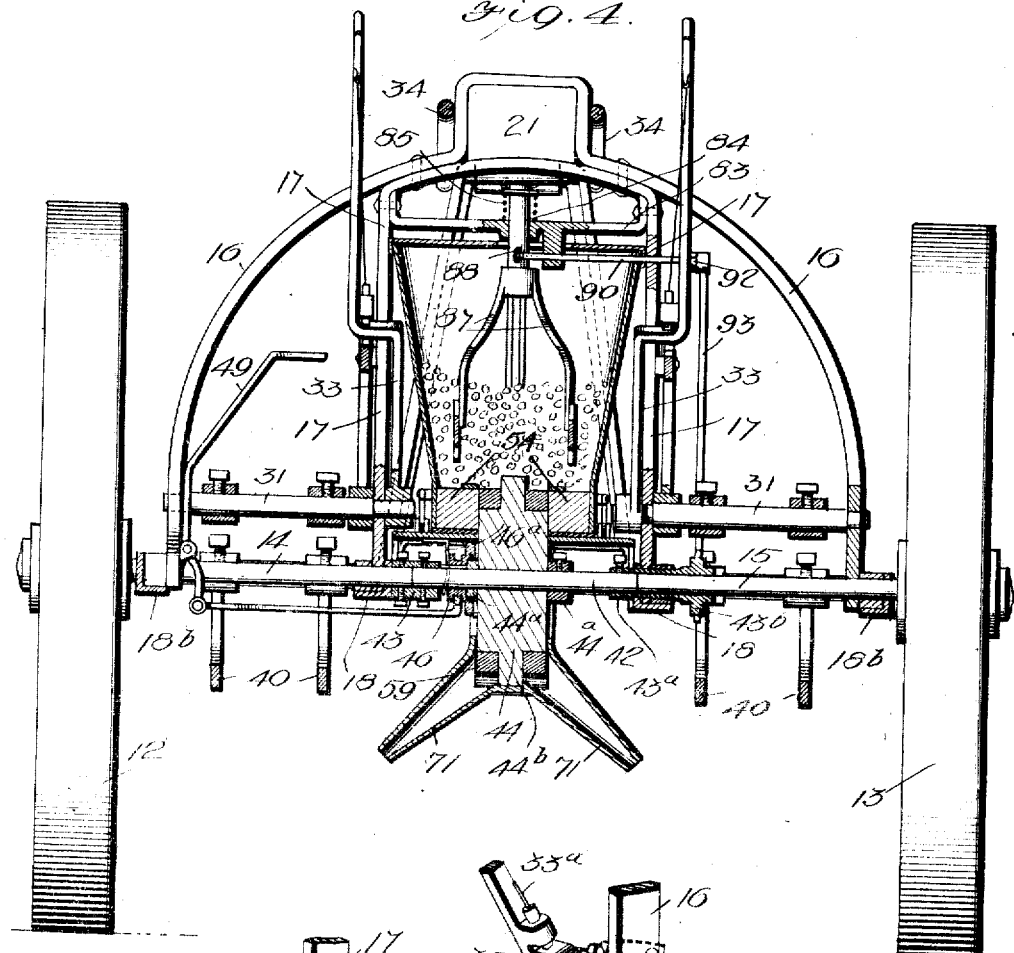

J. S. LYLE.
AGRICULTURAL IMPLEMENT.
APPLICATION FILED JUNE 29, 1916.
1,273,251.
Patented July 23, 1918.
5 SHEETS—SHEET 4.
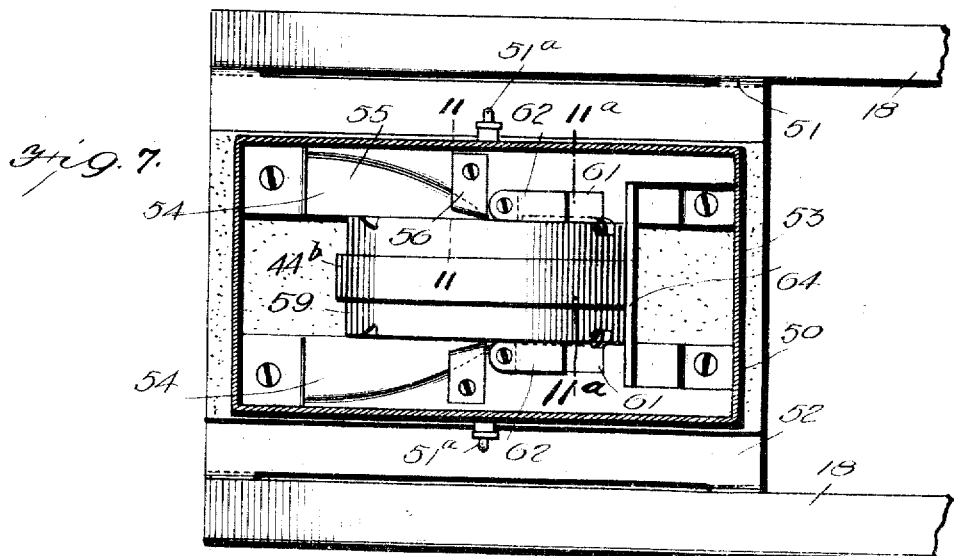
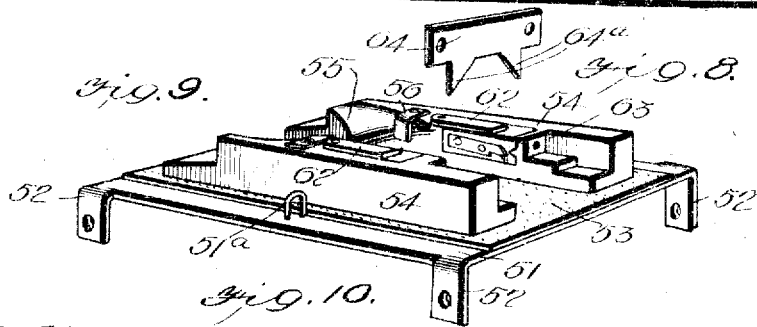
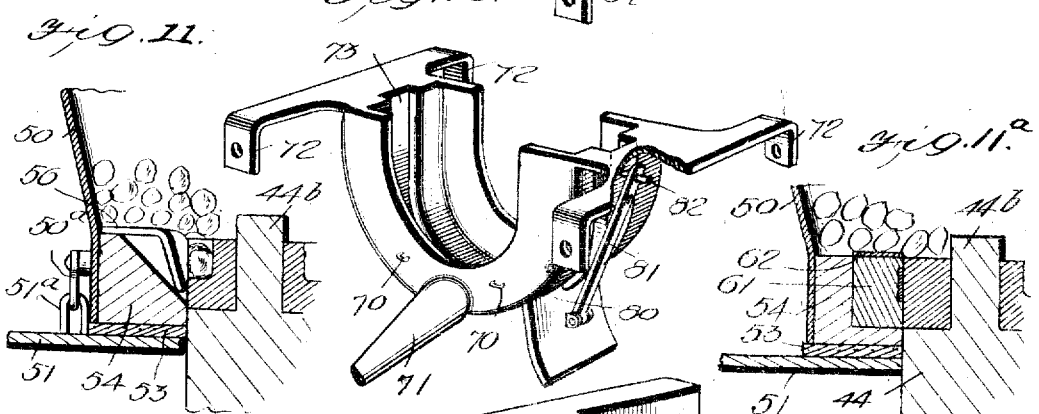
WITNESSES
INVENTOR
John S. Lyle
BY
ATTORNEYS

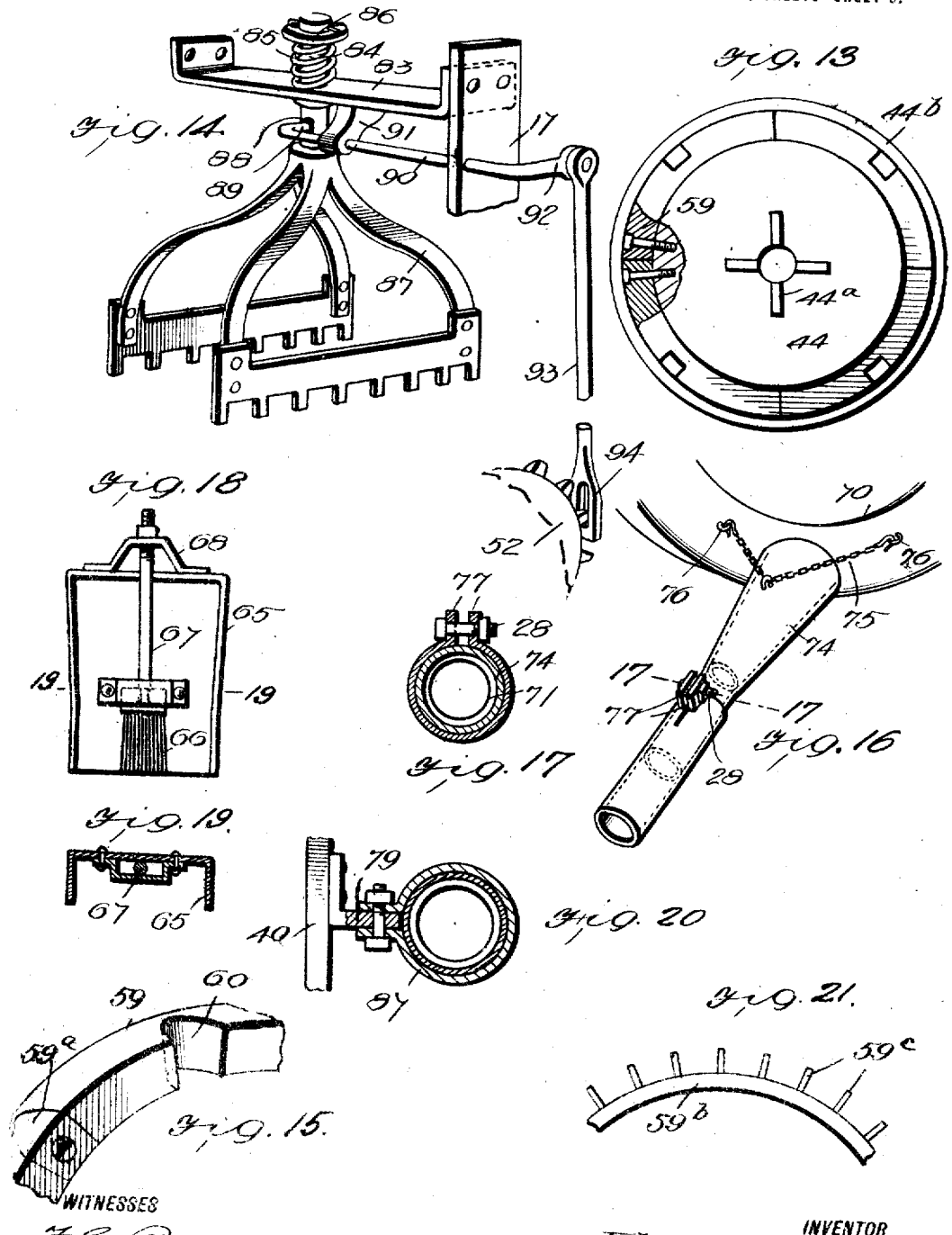

UNITED STATES PATENT OFFICE.

JOHN S. LYLE, OF McLOUD, OKLAHOMA.

AGRICULTURAL IMPLEMENT.

1,273,251.  Specification of Letters Patent.  Patented July 23, 1918.

Application filed June 29, 1916. Serial No. 106,721.

*To all whom it may concern:*

Be it known that I, JOHN S. LYLE, a citizen of the United States, and a resident of the town of McLoud, county of Pottawatomie, and State of Oklahoma, have invented new and useful Improvements in Agricultural Implements, of which the following is a specification, reference being had to the drawings accompanying the same.

This invention has a general reference to the art of agricultural machinery, and a more specific reference to a seeding apparatus, the details of which will be hereinafter described.

It is an object of the invention to provide a seed sowing device comprehending a single structure so provided and arranged that various kinds of seed may be sown simultaneously, so that at least two rows of seed may be sown, and in connection with this seed sowing device, means are provided for laying the rows at suitable distances apart according to the plan of sowing.

It is also an object of the invention to provide an agitator for disturbing the seed in the hopper and thus insure positive distribution.

This seed sowing device is provided with suitable interchangeable parts for the different kinds of seeds, rough and smooth, large or small, and planting one at a time, if desired, or sowing broad cast.

This being a new principle, it is not confined to this cultivator, but it may be made to apply to any suitable truck or frame, and there may be used as many seed - dropping disks as may be desired, which may be placed on the same shaft, and provided with a suitably sub-divided hopper, thus making each disk independent, and providing means for planting as many rows as desired, and planting different kinds of seed either in hills, drills, or broadcast and using, when desired, instrumentalities for making the rows different distances apart.

These and other objects of the invention will appear from a further reading of the following specification, taken in connection with the sheets of drawings accompanying and forming a part of the same, and on which like characters of reference will appear on like parts.

In these drawings,

Fig. 3 is a vertical longitudinal section taken substantially on line 3—3 of Fig. 2.

Fig. 4 is a vertical transverse section taken substantially on line 4—4 of Fig. 2.

Fig. 5 is a detail perspective view illustrating the adjusting connections of certain of the plow beams.

Fig. 6 is a detail vertical section through certain of the parts particularly seen in Fig. 5.

Fig. 7 is a horizontal section through the seeding apparatus, taken substantially on line 7—7 of Fig. 3.

Fig. 8 is a detail perspective view of the seed guard plate removed.

Fig. 9 is a detail perspective view of the base of the seed hopper with the controlling mechanism mounted thereon.

Fig. 10 is a detail perspective view, partly broken away and in section, of the seed casing.

Figure 1:
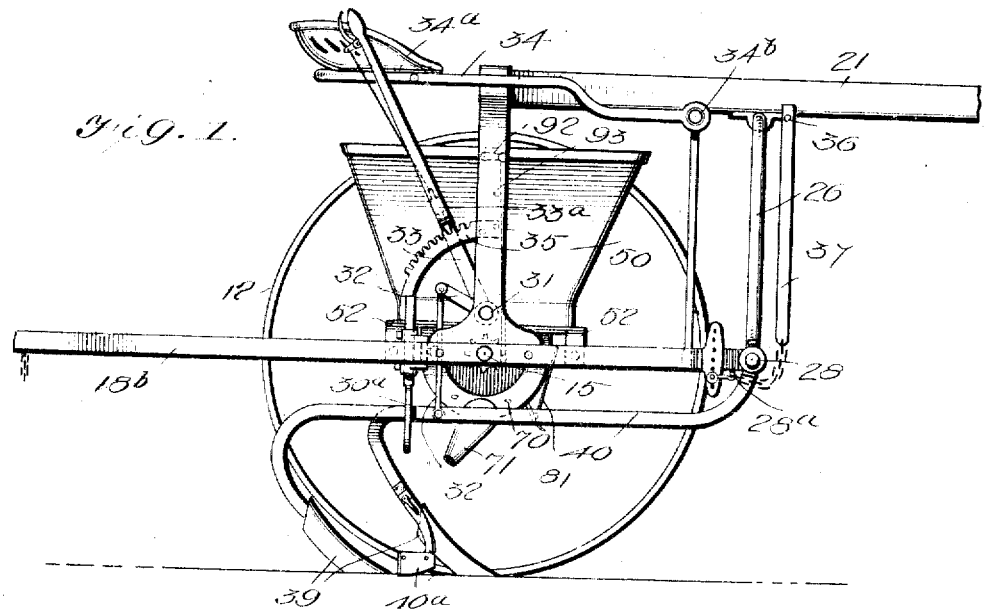
Figure 1 is a side elevation of my improved machine, illustrating the seeding mechanism in position.

Figs. 11 and 11ª are detail transverse sections through portions of the seeding mechanism, taken respectively, on lines 11—11 and 11ª—11ª of Fig. 7.

Fig. 12 is a detail perspective view of certain of the parts seen particularly in Fig. 9.

Fig. 13 is a side view, partly broken away and in section, of the seed feeding disk.

Fig. 14 is a detail perspective view of the seed agitating mechanism.

Fig. 15 is a detail perspective view of a fragmentary portion of one of the seed rings.

Fig. 16 is a detail perspective view illustrating a slight modification of one of the seed chutes.

Fig. 17 is a detail transverse section taken substantially on line 17—17 of Fig. 16.

Fig. 18 is an elevation of the seed guard.

Fig. 19 is a transverse section taken substantially on line 19—19 of Fig. 18.

Fig. 20 is a detail perspective view illustrating a slightly modified form, and

Fig. 21 is a sectional view through a fragmentary portion of a modified form of seed discharging ring, for cotton and like seed.

Referring now to these figures, and particularly to Figs. 1 to 6, inclusive, my machine in general includes a single pair of opposing side wheels 12 and 13, mounted in suitable boxings upon the outer ends of the parts 14 and 15 of a two part axle, the inner ends of which axle parts are substantially spaced apart and in coaxial relation. These two axial parts are supported by means of a transversely arched supporting yoke 16 having bearings at its lower outer ends for the outer portions of the axle parts, and by the side arms 17 of an inverted U-shaped support, the lower ends of which side arms have bearings for the inner portions of the said axial parts, and the upper cross-bar of which is rigidly secured to the yoke 16 intermediate the ends of the latter.

Each of the axle parts 14 and 15 is further supported by horizontally disposed side frames positioned substantially in the plane of the axles. Each of these side frames includes parallel inner and outer bars 18 and 18ª connected at their forward and rear ends by cross bars 19 and 19ª, the outer side bar 18ª having an inwardly curved rear portion 18ᵇ extending materially beyond the rear cross bar 19, the latter of which is but slightly in the rear of its respective axle part 14, 15.

The axle parts 14 and 15 have bearing through the side bars 18 and 18ª of the two side frames just above mentioned, which latter are connected at their forward portions by means of braces 23 and 24 extending downwardly from the tongue 21, the rear end of the latter of which is rigidly supported by the yoke 16 before mentioned.

Figure 2:
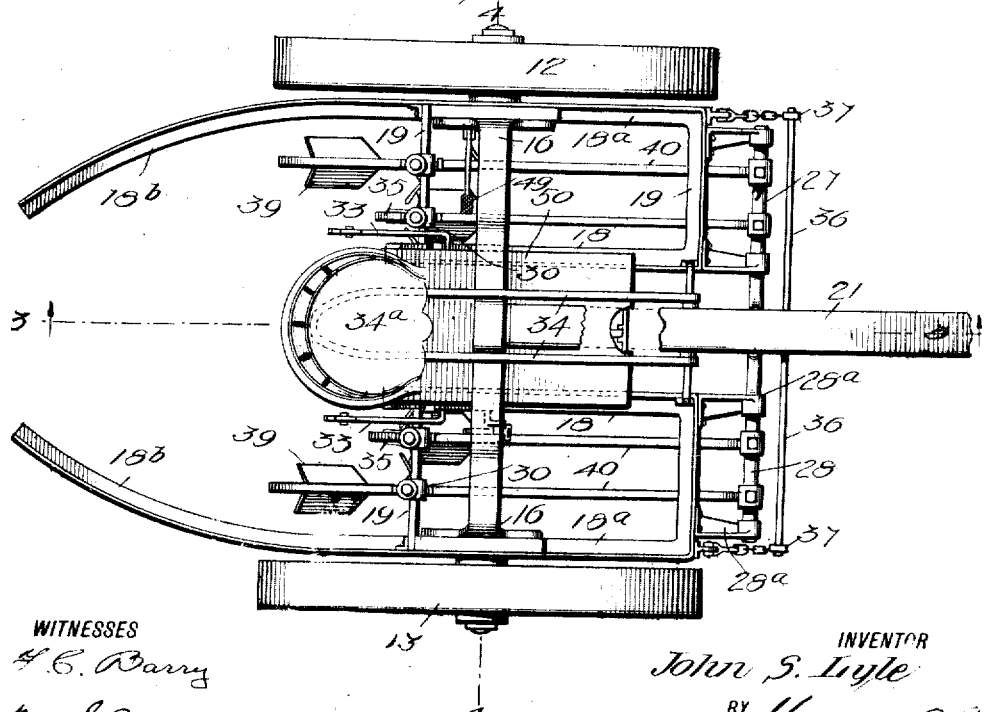
Fig. 2 is a top plan view thereof.

As best seen in Figs. 1 and 2, the tongue 21 further supports, at a point forwardly of the braces 23 and 24, a rod having depending portions 25 and 26 provided with horizontally extending bars 27 and 28 forwardly of the forward ends 19 of the two side frames, these bars 28 extending through bearing brackets projecting forwardly from the side frames, as seen at 28ª in Fig. 2, and in turn adjustably supporting the forward ends of the plow beams 40.

Thus, the plow beams 40 being movably supported at their forward ends upon the bars 27 and 28, these plow beams may be adjusted as desired, and raised and lowered through the means best seen in Fig. 5, the beams 40 passing through vertically slotted hangers 30ª adjustably secured to stirrups 30 the latter of which are in turn adjustably mounted upon the rear cross bars 19ª of the two side frames above mentioned. Furthermore, the plow beams 40 adjacent to each of the side frames above mentioned, are connected by vertical connecting rods 32ª to the adjustable arms 32 of an adjusting shaft 31, journaled transversely through the yoke 16 and the uprights 17, parallel with and above the respective axle sections 14, 15, each of the adjusting shafts 31 having an adjusting lever 33 connected thereto and provided with a latch mechanism 33ª engaging a stationary notched quadrant 35.

In this way the plow beams may be adjusted horizontally with respect to one another, and may also be raised and lowered in any position of adjustment, as desired.

The adjusting levers 33, moreover, extend upwardly at opposite sides of the operator's seat 34 secured upon the rear portion of a U-shaped seat supporting frame 34ª, the latter of which straddles the rear end of the tongue 21 and has its extensions pivotally connected at their forward extremities thereto at 34ᵇ.

An evener 36 is fulcrumed at an intermediate point to the tongue 21 and is attached at its outer end to substantially vertical rods 37, the latter being connected at their lower ends by chains 38 with the horizontal side frames above mentioned, either directly or indirectly through the bars 27 and 28 having bearing at the forward portions of the side frames as before described.

As before stated, the plow beams 40 are adjustable both horizontally and vertically and may be provided with suitable plow points to cultivate between rows of plants, the latter of which pass between the uprights 17 and therefore between the inner ends of the two axle parts 14 and 15 with the space clear, the plow points being indicated at 39. Where, however, the beams are utilized in connection with the seeding arrangement to be presently described, the two inner plow beams 40 have hook shaped pieces 40ª as seen in Figs. 1 and 3, in order to cover the seeds.

In utilizing the seeding arrangement to be presently described, the space between the ends of the axle parts 14 and 15 is occupied by an axially alined shaft 42, the ends of which are connected to the adjacent ends of the said axle parts 14 and 15, by collars 43 and 43ª, the former of which is secured to the axle section 14, and the latter of which revolves loosely upon the axle section 15 and is provided with a toothed wheel 43ᵇ, for a purpose to be presently described, this construction most clearly appearing in Fig. 4.

At one side of its center, the shaft 42 has a splined clutch member 46 normally held by means of a spring 47 in engagement with a clutch face at one side of a centrally disposed disk 44 mounted centrally on the shaft 42 between adjustable set collars 44ª, clutch member 46 being cored out sufficiently to engage the clutch face of the disk 44 around the adjacent set collar 44ª, so as to transmit motion from wheel 12 through axle part 14, shaft 42, and the clutch members to the disk 44.

A rod 47 has a yoke 48 at one end, as best seen in Fig. 4 and engaging the annularly grooved clutch member 46 and is pivotally connected at its opposite end to a foot lever 49 fulcrumed upon one side of the yoke 16, as plainly seen in Fig. 4, whereby pressure upon the said foot lever 49 will serve to withdraw the clutch member 46 out of engagement with the clutch face of the disk 44 and against the tension of the spring 46ª.

Where the machine is utilized as a seeder, a seed hopper 50 is disposed between the uprights 17 as clearly seen by a comparison of Figs. 1 and 4, for instance, the disk 44 in this case having its upper portion operating through a conformable opening in the base 51 of this hopper, which base as seen in Figs. 7 and 9 in particular, is provided with depending lugs 52 bolted to the inner side bars 18 of the two horizontal side frames before described. Upon the upper inner surface of the base 51 of the hopper 50 is secured a flexible strip 53 of leather or other suitable material, the portions of which surrounding the opening through which the upper portion of the disk 44 projects, are adapted to wipe the periphery of the disk in order to prevent loss of seed.

On the base 51 are secured spaced parallel seed blocks 54, upwardly between which the periphery of the disk 44 also extends, as best seen in Figs. 11 and 11ª, each of these blocks being cut away at 55 in order to receive seed from the interior of the hopper 50, in order that such seed may find its way into the seed openings of the seed rings carried by the disk 44, as presently to be explained, each block having a spring tooth 56 adjacent its cut away portion 55 which projects to a point substantially flush with the side surface of the respective seed rings in order to admit but one grain at a time to the seed opening of the ring.

In order to accommodate these seed rings 59, the latter of which are in segments as seen by reference to Fig. 13, the disk 44 has a circumferential outstanding rib 44ᵇ in its median plane, at opposite sides of which are annular recesses for the rings 59, the latter having seed openings or pockets 60 at variously spaced points, certain of which may be closed by plugs 59ª as seen in Fig. 15. On the other hand, the rings 59 instead of having well defined openings or seed pockets 60, may have peripherally projecting spikes or spurs 59ᶜ as seen in connection with the ring 59ᵇ illustrated in the modification Fig. 21, these spikes or spurs being adapted to the feeding of cotton and like seel.

Within a conformable cut-out portion of each of the seed blocks 54 above mentioned is a seed controlling member 61, normally held in place by a pivoted piece 62, and provided with a spring finger 63 to engage the adjacent side of the respective seed ring 59, each finger 63 being adapted to spring into each of the pockets of its seed ring as the pocket arrives opposite the same, in order to remove any surplus seed, and thus supplement the action of the spring tooth before described, in preventing waste of seed.

The above result may be materially aided by means of a guard plate 64 seen in detail in Fig. 8, the opposite end portions of which are secured to the blocks 54, the plate extending between these blocks at one side of the upper portion of the periphery of the seed disk 44, and having depending portions 64ª which substantially fit the periphery of the disk 44 with the two seed rings, and thus prevent discharge of surplus seed. Furthermore, a guard 65 may be secured within the hopper 50, having an adjustable wire guard member 66 to control the periphery of the disk 44 and the seed rings carried thereby in order to prevent discharge of surplus seed, this guard being carried upon the lower end of a rod 67 adjustably connected to a bracket 68 carried by the guard 65, as seen in Figs. 18 and 19.

Thus, it is apparent that with a seeding device as described, one or both seed rings may be utilized, dependent upon whether it is desired to sow one or two rows. Where only a single row is desired, one ring may be blank or may have its openings 60 closed by plugs 59ª, as previously described in connection with Fig. 15. Moreover, in the event of double row sowing of different seed, a partition of any suitable character not shown, may be slipped into the hopper 50 to divide the same so that the seed of a different kind may find its way to the other ring. Moreover, the seed pockets may, of course, be made larger or smaller, as desired, for larger or smaller seed, and by closing selected openings as by means of plugs 59ª, the seed hills may be variously spaced as described. Various other arrangements (not shown), may be utilized for planting different characters of seed, yet to all of which the general structure just above described is applicable.

The seed hopper 50 seats downwardly upon the base 51 and is connected in detachable relation by means of hooks 50ª depending from the hopper and engaging staples 51ª carried by the base 51, as seen in Figs. 7, 9 and 11, and at one side the hopper has a lower opening as seen in Fig. 3 normally covered by a slide 50ᵇ, so that any seed that remains in the hopper when, for instance, a change of seed is desired, may be readily removed.

Beneath the base plate 51 is a seed casing 70 as seen in Figs. 10 and 16 in particular, having laterally and downwardly projecting seed spouts 71 at its lower portion, and having lugs 72 at its upper portion secured similar to the lugs 52 of the base plate 51, so as to support the casing around the lower peripheral portion of the disk 44. This casing has a substantially central channel 53 which receives the rib 44" of the disk 44, thus dividing the casing 70 into two side compartments receiving the seed from the seed pockets of the seed rings before described, in the rotation of the disk, which seed falls through the discharge spouts 71. If it is desired to space the seed rows farther apart, supplemental seed spouts 74 such as seen in Fig 16, are utilized in telescoping relation upon the seed spouts 71 of the casing, these supplemental spouts being suitably connected in detachable relation by chains 75 and hooks 76, and being in lengthwise adjustable sections, one of which may have lugs 77 and a clamping bolt 78 through the lugs and connecting slotted portions thereof to securely clamp the same around the other section. Furthermore, the sections of the supplemental seed spouts 74 as seen in Fig. 16, may be connected by supporting brackets 79 with one of the plow beams 40 as seen in Fig. 20.

As seen in Figs. 3 and 10 the seed casing 70 has a hinged door 80, the position of which is controlled by a rod 81 pivotally connected to a portion of the said door at one end and having adjacent its opposite end a series of openings for engagement with a stationary pin 82. Thus, by opening the door 80 and securing the same in open position, the seed instead of discharging through the spouts 71 will fall through the door opening and striking the door, will scatter where seeding of this nature is desired.

As seen in Figs. 3, 4 and 14, in particular, I may utilize a seed agitating arrangement including a horizontally disposed and transversely extending supporting bar 83 secured at its opposite end to the uprights 17 to extend between the latter in a plane above the upper end of the hopper 50, and centrally through which bar 83 is journaled the upper portion of a stem 84, controlled by a spring 85 disposed between the upper surface of the bar 83 and a collar 86 at the upper extremity of the said stem. The lower portion of the stem 84 depends into the seed hopper 50 and is provided with a seed agitating frame 87, said stem having an opening or recess 88 into which the angular inner end 89 of an actuating rod 90 projects, said rod being journaled through one of the uprights 17 and a depending portion 91 of the bar 83 forming a bearing, and having its outer angular end 92 connected by a vertically disposed connecting rod 93 with the toothed wheel 52 before described, rod 93 having a pivotal connection with the angular end 92 and having at its lower end a slotted head 94 so as to be successively engaged and released by the teeth of the toothed wheel 52. Thus, vertically reciprocatory motions will be transmitted to the stem 84, its downward movement being under actuation of the connections to the toothed wheel 52, and its upward movement being brought about by the spring 85.

It is obvious that the seed rings 59 may be variously constructed for the purpose of feeding, and controlling the feed of, various kinds of seed, corn, cotton and the like, and that all changes in the specific construction for this purpose are well within the invention.

I claim:

1. A seeder including a rotatable disk having a circumferential rib around its median line and forming annular recesses at its opposite sides, seed rings detachably mounted in said recesses and independently removable, a hopper for the seed, and means within the hopper to separately control the discharge of seed by the said seed rings.

2. A seeder including a seed hopper, a rotatable disk the upper portion of which projects into the hopper, provided with a circumferential median rib forming annular spaces at its opposite sides, seed feeding rings detachably mounted in said spaces, a casing surrounding the lower portion of the disk and having an intermediate channel to receive said rib, whereby to thus divide the casing into separate compartments at its opposite sides and adjacent to the feeding rings, and discharge spouts leading from the opposite sides of said casing, for the purpose described.

3. A seeder including a seed hopper, a rotating disk the upper portion of which projects into the hopper, seed feeding rings removably supported by said disk, a casing surrounding the lower portion of said disk and rings to receive the seed from the latter, and having discharge spouts leading therefrom, and a broad-casting device carried by said casing.

4. A seeder including a seed hopper, a rotating disk the upper portion of which projects into the hopper, seed feeding rings removably supported by said disk, a casing surrounding the lower portion of said disk and rings to receive the seed from the latter, and having discharge spouts leading therefrom, and a broad-casting device carried by said casing, including an adjustable hinged door onto which the seed falls from the said rings when the door is in operative position.

5. A seeder including a seed hopper, a rotating disk the upper portion of which projects into the hopper, seed feeding rings removably supported by said disk, a casing surrounding the lower portion of said disk and rings to receive the seed from the latter, and having discharge spouts leading therefrom, and supplemental spouts removably associated with said first-named spouts, for the purpose described.

6. A seeder including a seed hopper, a rotating disk the upper portion of which projects into the hopper, seed feeding rings removably supported by said disk, a casing surrounding the lower portion of said disk and rings to receive the seed from the latter, and having discharge spouts leading therefrom, and supplemental spouts including relatively adjustable sections movably associated with the first-named spouts, for the purpose described.

Signed at Oklahoma, in the county and State of Oklahoma this sixteenth day of June, in the year of our Lord nineteen hundred and sixteen.

JOHN S. LYLE.